(12) United States Patent
Kurihashi et al.

(10) Patent No.: US 12,466,402 B2
(45) Date of Patent: Nov. 11, 2025

(54) FOLLOW-UP TRAVEL SUPPORT DEVICE, FOLLOW-UP TRAVEL SUPPORT METHOD AND NON TRANSITORY RECORDING MEDIUM

(71) Applicant: TOYOTA JIDOSHA KABUSHIKI KAISHA, Toyota (JP)

(72) Inventors: Sui Kurihashi, Sunto-gun (JP); Yoshiaki Atsumi, Susono (JP); Hayato Shirai, Tagata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 18/194,206

(22) Filed: Mar. 31, 2023

(65) Prior Publication Data

US 2023/0382375 A1 Nov. 30, 2023

(30) Foreign Application Priority Data

May 31, 2022 (JP) .................................. 2022-089167

(51) Int. Cl.
*B60W 30/14* (2006.01)
*B60W 50/14* (2020.01)

(52) U.S. Cl.
CPC .......... *B60W 30/143* (2013.01); *B60W 50/14* (2013.01); *B60W 2520/10* (2013.01); *B60W 2554/4041* (2020.02); *B60W 2556/45* (2020.02); *B60W 2720/10* (2013.01)

(58) Field of Classification Search
None
See application file for complete search history.

(56) References Cited

U.S. PATENT DOCUMENTS

| | | | |
|---|---|---|---|
| 10,001,781 B2* | 6/2018 | Nakamura | B60W 30/09 |
| 10,259,456 B2* | 4/2019 | Park | G08G 1/096791 |
| 10,336,336 B2* | 7/2019 | Matsumoto | B60W 30/16 |
| 10,825,344 B2* | 11/2020 | Belapurkar | G06Q 20/0855 |
| 11,119,634 B2* | 9/2021 | Kim | B60K 35/28 |
| 11,186,277 B2* | 11/2021 | Bauer | B60W 30/143 |
| 11,493,936 B2* | 11/2022 | Park | G06Q 20/3224 |
| 11,496,871 B2* | 11/2022 | Yang | G08G 1/0116 |
| 11,501,646 B2* | 11/2022 | Kumar | H04W 4/46 |
| 11,618,465 B2* | 4/2023 | Cassebaum | G08G 1/22 |
| | | | 701/27 |
| 11,935,407 B1* | 3/2024 | Wang | G08G 1/127 |
| 12,050,474 B2* | 7/2024 | Switkes | G05D 1/0295 |

(Continued)

FOREIGN PATENT DOCUMENTS

| | | |
|---|---|---|
| JP | H05141285 A | 6/1993 |
| JP | 2000006683 A | 1/2000 |

(Continued)

*Primary Examiner* — Jonathan M Dager
(74) *Attorney, Agent, or Firm* — Hunton Andrews Kurth LLP

(57) ABSTRACT

The follow-up travel support device includes a processor configured to detect a surrounding vehicle around a host vehicle, and set a target vehicle speed of the host vehicle. The processor is configured to set the target vehicle speed to a speed different from a set speed of the host vehicle until a partner vehicle that performs a follow-up travel in which a following vehicle follows a preceding vehicle together with the host vehicle is detected as the surrounding vehicle.

9 Claims, 7 Drawing Sheets

(56) References Cited

U.S. PATENT DOCUMENTS

| | | |
|---|---|---|
| 2007/0005218 A1 | 1/2007 | Ueyama |
| 2010/0256836 A1* | 10/2010 | Mudalige ................ G08G 1/22 701/25 |
| 2010/0256852 A1* | 10/2010 | Mudalige ................ G08G 1/22 701/24 |
| 2013/0184926 A1* | 7/2013 | Spero .................... B60W 10/20 701/25 |
| 2014/0292545 A1* | 10/2014 | Nemoto ................. G08G 1/163 340/988 |
| 2015/0127189 A1* | 5/2015 | Mehr .................... G05D 1/0295 701/1 |
| 2015/0360684 A1* | 12/2015 | Matsuno ......... B60W 30/18163 701/23 |
| 2016/0054736 A1* | 2/2016 | Kolhouse ............. G05D 1/0293 701/96 |
| 2016/0075333 A1* | 3/2016 | Sujan .................... B60W 10/04 701/25 |
| 2016/0267796 A1* | 9/2016 | Hiroma ................. B60W 50/14 |
| 2016/0272204 A1* | 9/2016 | Takahashi ........... B60W 30/165 |
| 2016/0297447 A1* | 10/2016 | Suzuki ................. B60W 30/16 |
| 2016/0375905 A1* | 12/2016 | Park ..................... B60W 30/16 701/96 |
| 2018/0188746 A1* | 7/2018 | Lesher ................. G05D 1/0217 |
| 2018/0211546 A1* | 7/2018 | Smartt ................. H04W 4/023 |
| 2019/0096264 A1* | 3/2019 | Park .................... B60W 30/165 |
| 2019/0171227 A1* | 6/2019 | Sujan ................... G05D 1/0295 |
| 2019/0184994 A1 | 6/2019 | Mizuno et al. |
| 2019/0220037 A1* | 7/2019 | Vladimerou .......... G05D 1/0293 |
| 2020/0057453 A1* | 2/2020 | Laws ....................... G08G 1/22 |
| 2020/0079376 A1* | 3/2020 | Fujiwara .......... G08G 1/096775 |
| 2020/0108829 A1* | 4/2020 | Bauer .................. G08G 1/0141 |
| 2020/0286387 A1* | 9/2020 | Zhou .................. G08G 1/0175 |
| 2021/0031767 A1* | 2/2021 | Kim ...................... B60Q 1/507 |
| 2021/0046932 A1* | 2/2021 | Kegelman ................ G08G 1/22 |
| 2021/0141393 A1* | 5/2021 | Nakada .................. H04W 4/40 |
| 2021/0146925 A1* | 5/2021 | Kim ........................ G08G 1/22 |
| 2021/0148715 A1* | 5/2021 | Atanasiu ............... G05D 1/0088 |
| 2021/0197826 A1* | 7/2021 | Baum ..................... H04W 4/46 |
| 2021/0232157 A1* | 7/2021 | Dieckmann .......... G05D 1/0293 |
| 2021/0240201 A1* | 8/2021 | Okuyama ............. G05D 1/0293 |
| 2021/0247777 A1* | 8/2021 | Jornod ................. G05D 1/0217 |
| 2021/0264794 A1* | 8/2021 | Merwaday ............. H04W 4/46 |
| 2021/0291868 A1* | 9/2021 | Okuda ............. B60W 60/0015 |
| 2022/0063621 A1* | 3/2022 | Austin ................. G06V 20/584 |
| 2022/0105935 A1* | 4/2022 | Sasai ........................ G08G 1/22 |
| 2022/0126841 A1* | 4/2022 | Kim ................ B60W 30/18163 |
| 2022/0292983 A1* | 9/2022 | Brandin .................. G08G 1/22 |
| 2022/0348241 A1* | 11/2022 | Soule ...................... B61L 21/10 |
| 2022/0351625 A1* | 11/2022 | Qi ........................ B60W 30/165 |
| 2023/0054037 A1* | 2/2023 | Switkes ................. G05D 1/244 |
| 2023/0256969 A1* | 8/2023 | Li ........................ B60W 40/04 701/26 |
| 2025/0155890 A1* | 5/2025 | Wang ............... G08G 1/096791 |

FOREIGN PATENT DOCUMENTS

| | | |
|---|---|---|
| JP | 2007008298 A | 1/2007 |
| JP | 2007186097 A | 7/2007 |
| JP | 2019107996 A | 7/2019 |
| JP | 2020042649 A | 3/2020 |
| WO | 2020044904 A1 | 3/2020 |

* cited by examiner

FOLLOW-UP TRAVEL SUPPORT DEVICE, FOLLOW-UP TRAVEL SUPPORT METHOD AND NON TRANSITORY RECORDING MEDIUM

CROSS-REFERENCE TO RELATED APPLICATION

The present application claims priority to Japanese Patent Application No. 2022-089167 filed on May 31, 2022, which is incorporated herein by reference in its entirety.

FIELD

The present disclosure relates to a follow-up travel support device, a follow-up travel support method, and a non-transitory recording medium.

BACKGROUND

PTL 1 discloses correcting a target inter-vehicle distance with respect to a preceding vehicle in accordance with an interruption state of another vehicle into a space between the host vehicle and the preceding vehicle when the follow-up travel in which the host vehicle follows the preceding vehicle is performed.

CITATIONS LIST

Patent Literature

[PTL 1] Japanese Unexamined Patent Publication No. 05-141285

SUMMARY

Technical Problem

In the follow-up travel in which the following vehicle follows the preceding vehicle, the air resistance acting on the following vehicle is reduced by the wind protection effect of the preceding vehicle, and the fuel consumption or the power consumption in the following vehicle is reduced.

However, even if the occupant of the host vehicle desires to follow the other vehicle, the vehicle suitable as the tracking target does not necessarily travel in the vicinity of the host vehicle. In addition, in a case where some incentive is given to the preceding vehicle in the follow-up travel, it is conceivable that the occupant of the host vehicle desires to follow the host vehicle by the other vehicle. However, in this case as well, the vehicle that desires to follow is not necessarily traveling in the vicinity of the host vehicle. In particular, in a case where a partner vehicle (a preceding vehicle or a following vehicle in the follow-up travel) that performs the follow-up travel together with the host vehicle is traveling at a speed similar to that of the host vehicle at a position away from the host vehicle, it is difficult for the host vehicle to encounter the partner vehicle and start the follow-up travel.

In view of the above-described problems, an object of the present disclosure is to increase the probability that the host vehicle encounters the partner vehicle that performs the follow-up travel in which the following vehicle follows the preceding vehicle together with the host vehicle.

Solution to Problem

The summary of the present disclosure is as follows.

(1) A follow-up travel support device comprising a processor configured to: detect a surrounding vehicle around a host vehicle; and set a target vehicle speed of the host vehicle, wherein the processor is configured to set the target vehicle speed to a speed different from a set speed of the host vehicle until a partner vehicle that performs a follow-up travel in which a following vehicle follows a preceding vehicle together with the host vehicle is detected as the surrounding vehicle.

(2) The follow-up travel support device described in above (1), wherein the set speed of the host vehicle is a set speed of an adaptive cruise control set by an occupant of the host vehicle, and the processor is configured to control acceleration and deceleration of the host vehicle so that a speed of the host vehicle becomes the target vehicle speed.

(3) The follow-up travel support device described in above (2), wherein the processor is configured to notify the occupant of the host vehicle that the speed of the host vehicle is changed from the set speed of the adaptive cruise control via an output device of the host vehicle.

(4) The follow-up travel support device described in above (1), wherein acceleration and deceleration of the host vehicle is controlled by a driver of the host vehicle, and the processor is configured to notify the driver of the host vehicle of the target vehicle speed via an output device of the host vehicle.

(5) The follow-up travel support device described in any one of above (1) to (4), wherein the processor is configured to set the target vehicle speed to a speed lower than the set speed until the partner vehicle is detected as the surrounding vehicle when a SOC of a battery of the host vehicle or a remaining fuel amount of the host vehicle is equal to or less than a predetermined value.

(6) The follow-up travel support device described in any one of above (1) to (4), wherein the processor is configured to set the target vehicle speed to a speed higher than the set speed until the partner vehicle is detected as the surrounding vehicle when a current time is included in a predetermined time zone.

(7) The follow-up travel support device described in any one of above (1) to (4), wherein the processor is configured to set the target vehicle speed based on preference information preset by an occupant of the host vehicle until the partner vehicle is detected as the surrounding vehicle.

(8) The follow-up travel support device described in any one of above (1) to (4), wherein the processor is configured to set the target vehicle speed based on information transmitted from a server outside the host vehicle to the host vehicle until the partner vehicle is detected as the surrounding vehicle.

(9) The follow-up travel support device described in any one of above (1) to (4), wherein the processor is configured to set the target vehicle speed to a speed lower than the set speed until the partner vehicle is detected as the surrounding vehicle when the set speed is equal to or higher than a predetermined value, and set the target vehicle speed to a speed higher than the set speed until the partner vehicle is detected as the surrounding vehicle when the set speed is less than the predetermined value.

(10) The follow-up travel support device described in any one of above (1) to (4), wherein the processor is configured to propose a lane change to a lane suitable for the target vehicle speed to the driver of the host vehicle via an output device of the host vehicle when setting the target vehicle speed to a speed different from the set speed of the host vehicle.

(11) A follow-up travel support method executed by a computer, comprising: detecting a surrounding vehicle around a host vehicle; and setting a target vehicle speed of the host vehicle to a speed different from a set speed of the host vehicle until a partner vehicle that performs a follow-up travel in which a following vehicle follows a preceding vehicle together with the host vehicle is detected as the surrounding vehicle.

(12) A non-transitory recording medium having recorded thereon a computer program, the computer program causing a computer to: detect a surrounding vehicle around a host vehicle; and set a target vehicle speed of the host vehicle to a speed different from a set speed of the host vehicle until a partner vehicle that performs a follow-up travel in which a following vehicle follows a preceding vehicle together with the host vehicle is detected as the surrounding vehicle.

According to the present disclosure, it is possible to increase the probability that the host vehicle encounters the partner vehicle that performs the follow-up travel in which the following vehicle follows the preceding vehicle together with the host vehicle.

DESCRIPTION OF EMBODIMENTS

Figure 1:
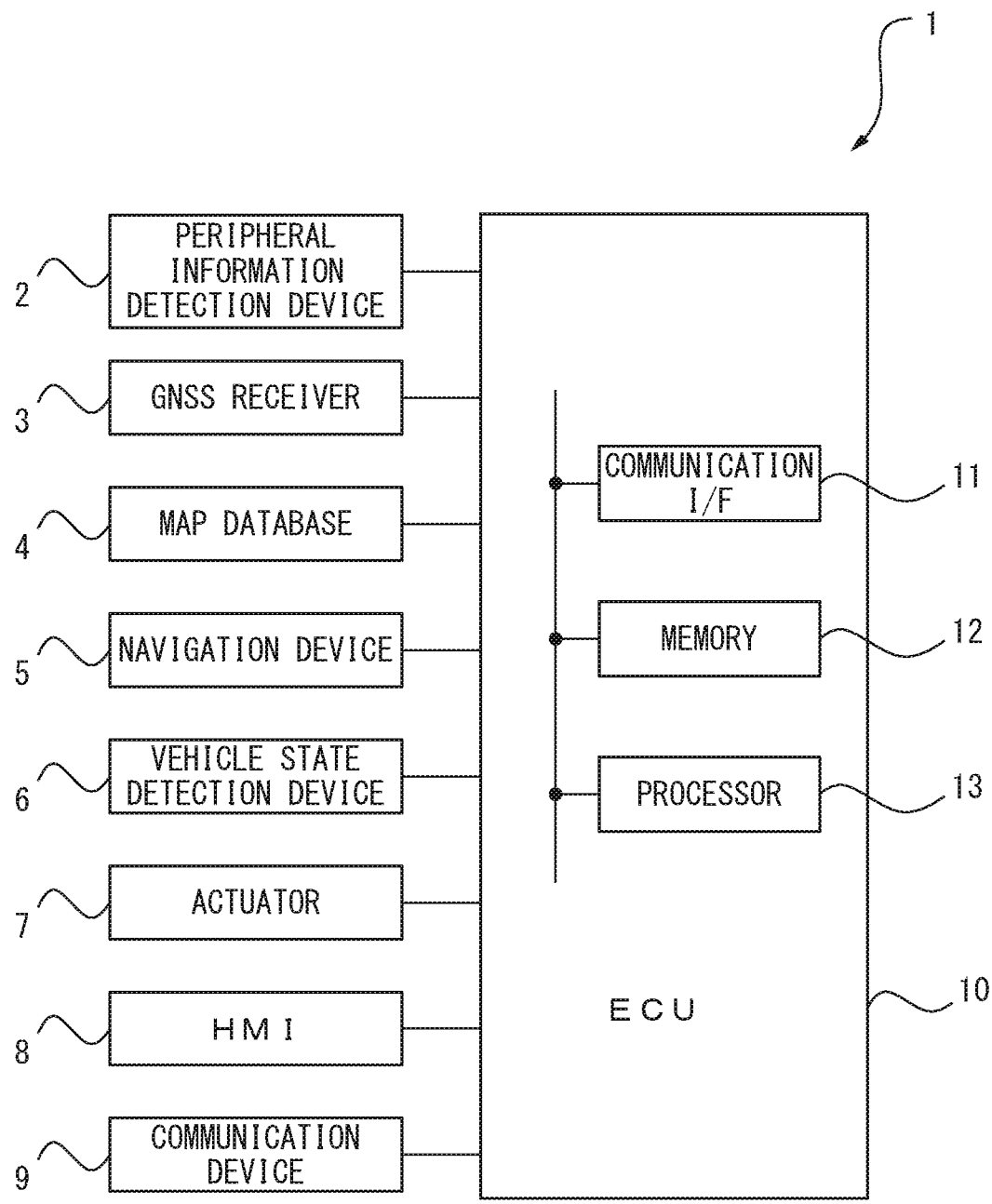
FIG. 1 is a schematic configuration diagram of a vehicle control system including a follow-up travel support device according to a first embodiment of the present disclosure.

Hereinafter, embodiments of the present disclosure will be described in detail with reference to the drawings. In the following description, the same reference numerals are given to the same constituent elements.

First Embodiment

Hereinafter, a first embodiment of the present disclosure will be described referring to FIG. 1 to FIG. 5.

FIG. 1 is a schematic configuration diagram of the vehicle control system 1 including the follow-up travel support device according to the first embodiment of the present disclosure. The vehicle control system 1 is mounted on a vehicle and executes various types of control of the vehicle.

As shown in FIG. 1, the vehicle control system 1 comprises a peripheral information detection device 2, a GNSS (Global Navigation Satellite System) receiver 3, a map database 4, a navigation device 5, a vehicle state detecting device 6, an actuator 7, a human machine interface (HMI: Human Machine Interface) 8, a communication device 9 and an electronic control unit (ECU) 10. The peripheral-information detecting device 2, the GNSS receiver 3, the map-database 4, the navigational device 5, the vehicle state detecting device 6, the actuator 7, the HMI 8 and the communication device 9 are electrically connected to the ECU 10 via an in-vehicle network compliant with standards such as CAN(Controller Area Network).

The peripheral information detection device 2 acquires data (images, point cloud data, and the like) around the vehicle (the host vehicle) and detects surrounding information (for example, a surrounding vehicle, a lane, and the like) of the vehicle. For example, the peripheral information detection device 2 includes a millimeter-wave radar, a camera (e.g., a stereo camera), a LIDAR (Laser Imaging Detection And Ranging) or an ultrasonic sensor (sonar), or any combination thereof. Output of the peripheral information detection device 2, that is, the peripheral information of the vehicle detected by the peripheral information detection device 2 is transmitted to ECU 10.

The GNSS receiver 3 detects the present position of the vehicle (for example, the latitude and longitude of the vehicle) based on the positioning information obtained from a plurality of (for example, three or more) positioning satellites. Specifically, the GNSS receiver 3 captures a plurality of positioning satellites and receives radio waves transmitted from the positioning satellites. Then, the GNSS receiver 3 calculates the distance to the positioning satellite based on the difference between the transmission time and the reception time of the radio wave, and detects the present position of the vehicle based on the distance to the positioning satellite and the position (orbit information) of the positioning satellite. The output of GNSS receiver 3, i.e. the present position of the vehicle detected by GNSS receiver 3, is transmitted to ECU 10. A GPS receiver is one example of the GNSS receiver.

The map database 4 stores map information. The ECU 10 obtains map data from the map data base 4. Note that a map database may be provided outside the vehicle (e.g., servers, etc.), and the ECU 10 may acquire map information from outside the vehicle.

The navigation device 5 sets the travel route of the vehicle to the destination based on the present position of the vehicle detected by the GNSS receiver 3, the map information of the map database 4, the input by the occupant (for example, a driver) of the vehicle, and the like. The travel route set by the navigational device 5 is sent to the ECU 10.

The vehicle state detecting device 6 detects parameters related to the vehicle state. The vehicle state detecting device 6 includes, for example, a vehicle speed sensor that detects a speed of the vehicle, a yaw rate sensor that detects a yaw rate of the vehicle, a battery current sensor that detects an input/output current of a battery of the vehicle, and the like. The output of the vehicle state detecting device 6, i.e. the parameters detected by the vehicle state detecting device 6, is transmitted to the ECU 10.

The actuator 7 operates the vehicle. For example, the actuator 7 includes a drive device for acceleration of the vehicle (for example, at least one of an internal combustion engine and an electric motor), a brake actuator for braking the vehicle, a steering actuator for steering the vehicle, and the like. The ECU 10 controls the actuator 7 to control the behavior of the vehicles.

In the present embodiment, the vehicle control system 1 functions as an ADAS (Advanced Driving Assistant System) and controls the actuator 7 to realize a predetermined driving support function. The predetermined driving assistance function includes, for example, an adaptive cruise control (ACC: Adaptive Cruise Control) that automatically controls the velocity of the vehicle according to the presence or absence of the preceding vehicle, a lane keeping assist (LKA) or a lane tracing assist (LTA) that automatically controls the steering of the vehicle so that the vehicle is maintained in the lane, and the like.

In ACC, the acceleration and deceleration of the vehicle is controlled so that the vehicle follows the preceding vehicle within the set speed set by the driver of the vehicle. That is, when the speed of the preceding vehicle is equal to or lower than the set speed, the follow-up travel to the preceding vehicle is performed, and when the speed of the preceding vehicle is higher than the set speed or when the preceding vehicle is not present, the constant speed travel that maintains the speed of the vehicle at the set speed is performed.

The HMI 8 transmits and receives data between the vehicle and an occupant (for example, a driver) of the vehicle. The HMI 8 includes an output unit (for example, a display, a speaker, a vibrating unit, and the like) that provides information to an occupant of the vehicle, and an input unit (for example, a touch panel, an operation button, an operation switch, a microphone, and the like) to which information is input by the occupant of the vehicle. The output of the ECU 10 is notified to the occupant of the vehicle via the HMI 8, and the input from the occupant of the vehicle is transmitted to the ECU 10 via the HMI 8. The HMI 8 is a one example of an input device, an output device, or an input/output device. Note that a mobile terminal (smart phone, tablet terminal, or the like) of an occupant of the vehicle may be connected to the ECU 10 so as to be able to communicate with each other by wire or wirelessly, and may function as the HMI 8. The HMI 8 may be integral with the navigational device 5.

The communication device 9 is capable of communicating with the outside of the vehicle, and enables communication between the vehicle and the outside of the vehicle. For example, the communication device 9 includes a wide area communication device that enables wide area communication between the vehicle and the outside of the vehicle (e.g., servers) via a communication network such as the Internet network, an inter-vehicle communication device that enables inter-vehicle communication between the vehicle and the surrounding vehicle using a predetermined frequency band, and a road-to-vehicle communication device that enables road-to-vehicle communication between the vehicle and the roadside device using a predetermined frequency band.

The ECU 10 performs various controls of the vehicle. As shown in FIG. 1, the ECU 10 comprises a communication interface 11, a memory 12 and a processor 13. The communication interface 11 and the memory 12 are connected to the processor 13 via a signal line. In the present embodiment, one ECU 10 is provided, but a plurality of ECUs may be provided for each function.

The communication interface 11 has an interface circuitry for connecting ECU 10 to the in-vehicle networking. The ECU 10 is connected to other in-vehicle devices via the communication interface 11.

The memory 12 includes, for example, a volatile semiconductor memory and a non-volatile semiconductor memory. The memory 12 stores programs, data, and the like used when various kinds of processing are executed by the processor 13.

The processor 13 comprises one or more CPU (Central Processing Unit) and its peripheral circuitry. The processor 13 may further include an arithmetic circuit such as a logical arithmetic unit or a numerical arithmetic unit.

In order to reduce the amount of fuel or electric power required for the vehicle to travel, it is effective to reduce the air resistance during the travel. As a method for reducing the air resistance during traveling, follow-up travel in which the following vehicle follows the preceding vehicle is exemplified. In the follow-up travel, the air resistance acting on the following vehicle is reduced by the wind protection effect of the preceding vehicle. Incidentally, platooning in which a plurality of vehicles travel in a platoon is an example of the follow-up travel.

Figure 2:
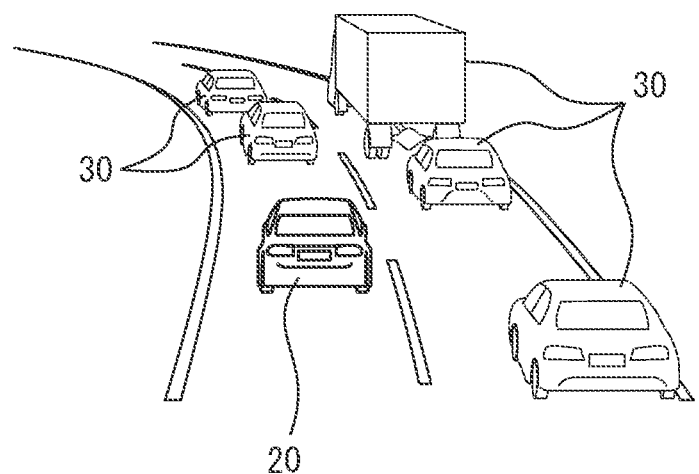
FIG. 2 is an example of a scene in which a plurality of vehicles are traveling on an automobile road.

FIG. 2 is an example of a scene in which a plurality of vehicles are traveling on an automobile road. In the example of FIG. 2, five surrounding vehicles 30 are traveling around the host vehicle 20. In such a situation, when the occupant of the host vehicle 20 desires to follow the other vehicle, a plurality of vehicles (five neighboring vehicles 30) are candidates for the preceding vehicle of the host vehicle 20 in the follow-up travel.

However, even if the occupant of the host vehicle desires to follow the other vehicle, the vehicle suitable as the tracking target does not necessarily travel in the vicinity of the host vehicle. In addition, in a case where some incentive is given to the preceding vehicle in the follow-up travel, it is conceivable that the occupant of the host vehicle desires to follow the host vehicle by the other vehicle. However, in this case as well, the vehicle that desires to follow is not necessarily traveling in the vicinity of the host vehicle.

In particular, in a case where a partner vehicle (a preceding vehicle or a succeeding vehicle in the follow-up travel) that performs the follow-up travel together with the host vehicle is traveling at a speed similar to that of the host vehicle at a position away from the host vehicle, it is difficult for the host vehicle to encounter the partner vehicle and start the follow-up travel. Therefore, in the present embodiment, the ECU 10 provided in the host vehicle functions as the follow-up travel support device that supports the follow-up travel of the host vehicle, and executes control for increasing the likelihood that the host vehicle encounters the partner vehicle.

Figure 3:
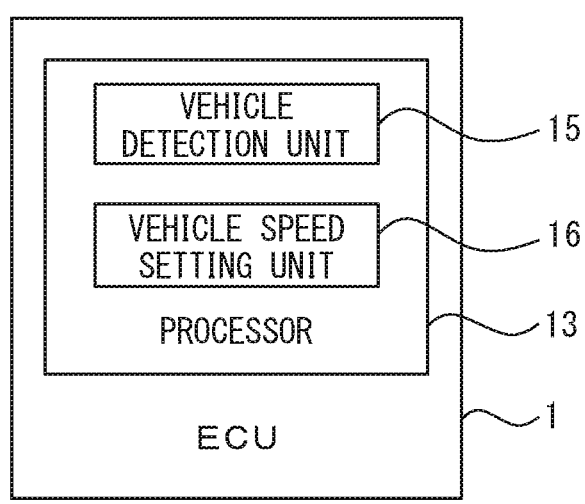
FIG. 3 is a functional diagram of a processor of an ECU.

FIG. 3 is a functional diagram of the processor 13 of the ECU 10. In the present embodiment, the processor 13 includes a vehicle detection unit 15 and a vehicle speed setting unit 16. The vehicle detection unit 15 and the vehicle speed setting unit 16 are functional modules realized by the processor 13 of the ECU 10 executing programs stored in the memory 12 of the ECU 10. These functional modules may be realized by dedicated arithmetic circuits provided in the processor 13.

The vehicle detection unit 15 detects a surrounding vehicle around the host vehicle. When the partner vehicle is detected as a surrounding vehicle, the vehicle detection unit 15 notifies the occupant of the host vehicle of the partner vehicle.

The vehicle speed setting unit 16 sets a target vehicle speed of the host vehicle. For example, when ACC is activated, the vehicle speed setting unit 16 sets the target vehicle speed to ACC set speed set by the occupant of the host vehicle (for example, the driver), and controls the acceleration and deceleration of the host vehicle so that the speed of the host vehicle is maintained at the ACC set speed.

Further, in order to smoothly perform the follow-up travel, it is desirable to select, as the partner vehicle, another vehicle that is traveling at a speed similar to the set speed of the host vehicle. However, when such a vehicle does not exist in the vicinity of the host vehicle, it is difficult for the host vehicle to encounter the partner vehicle and start the follow-up travel.

Therefore, in the present embodiment, the vehicle speed setting unit 16 sets the target vehicle speed to a speed different from the set speed of the host vehicle until the vehicle detection unit 15 detects the partner vehicle as the surrounding vehicle. As a result, the relative speed between the host vehicle and the partner vehicle can be temporarily increased, and thus the probability that the host vehicle encounters the partner vehicle can be increased.

When the host vehicle is a vehicle (for example, an electric vehicle (BEV), a plug-in hybrid vehicle (PHEV), or the like) that uses electric power as a power source, the higher the speedy of the host vehicle, the more the battery consumptions electric power. Therefore, when a SOC of the battery is low, it is difficult to increase the speedy of the host vehicle. For this reason, for example, when the SOC of the battery of the host vehicle is equal to or less than the predetermined value, the vehicle speed setting unit 16 sets the target vehicle speed of the host vehicle to a speed lower than the set speed of the host vehicle until the partner vehicle is detected as the surrounding vehicle. As a result, it is possible to increase the probability that the host vehicle encounters the partner vehicle traveling behind the host vehicle while avoiding the power shortage in the host vehicle.

In addition, in a time zone such as a commuting time in the morning, it is necessary to avoid a delay in arrival time to the destination as much as possible. For this reason, for example, when the current time is included in the predetermined time zone, the vehicle speed setting unit 16 sets the target vehicle speed of the host vehicle to a speed higher than the set speed of the host vehicle until the partner vehicle is detected as the surrounding vehicle. This can increase the probability that the host vehicle encounters a partner vehicle traveling in front of the host vehicle while avoiding a delay in arrival time to the destination.

Figure 4:
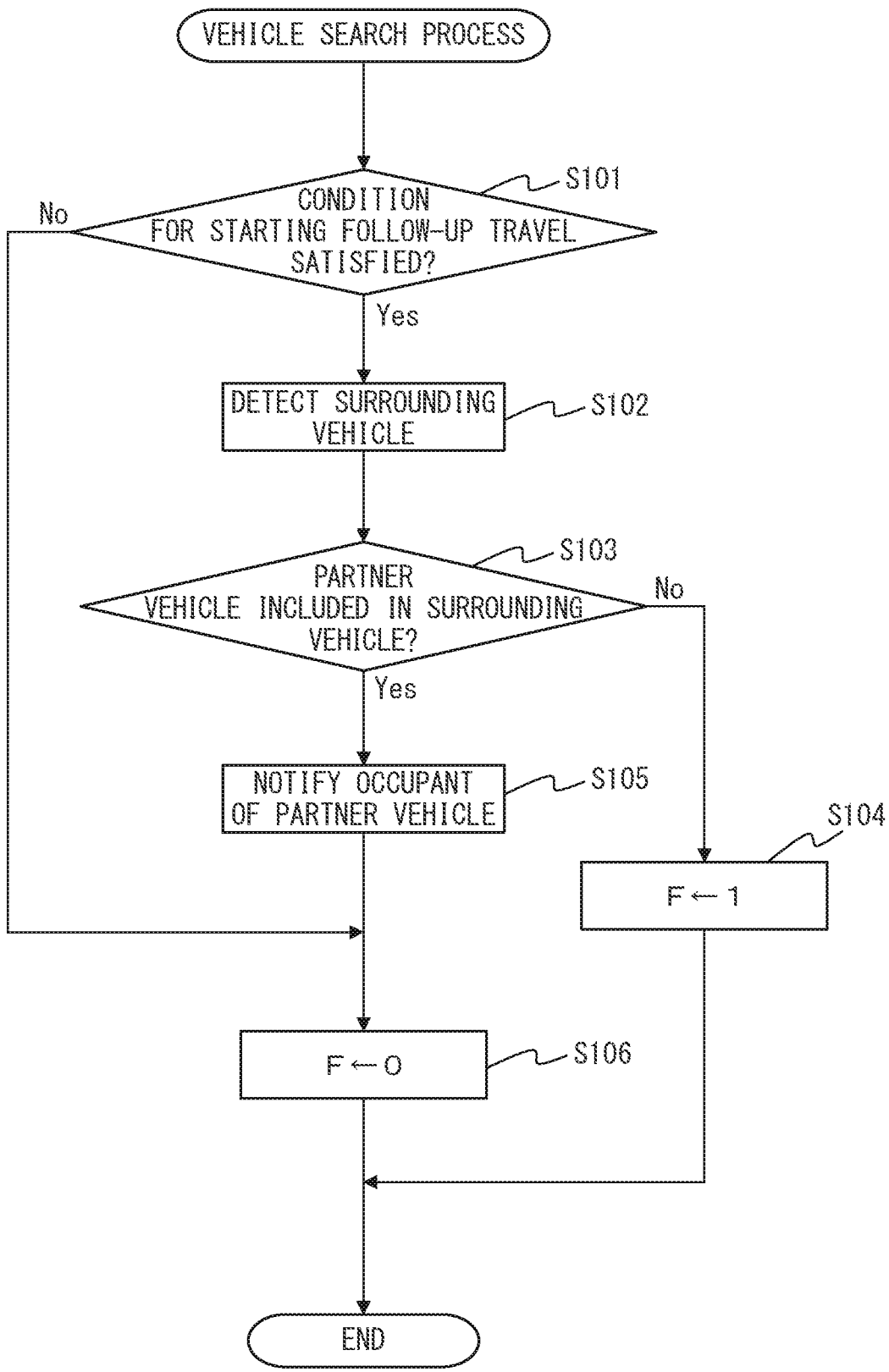
FIG. 4 is a flow chart showing the control routine of the vehicle search process according to the first embodiment.
Figure 5:
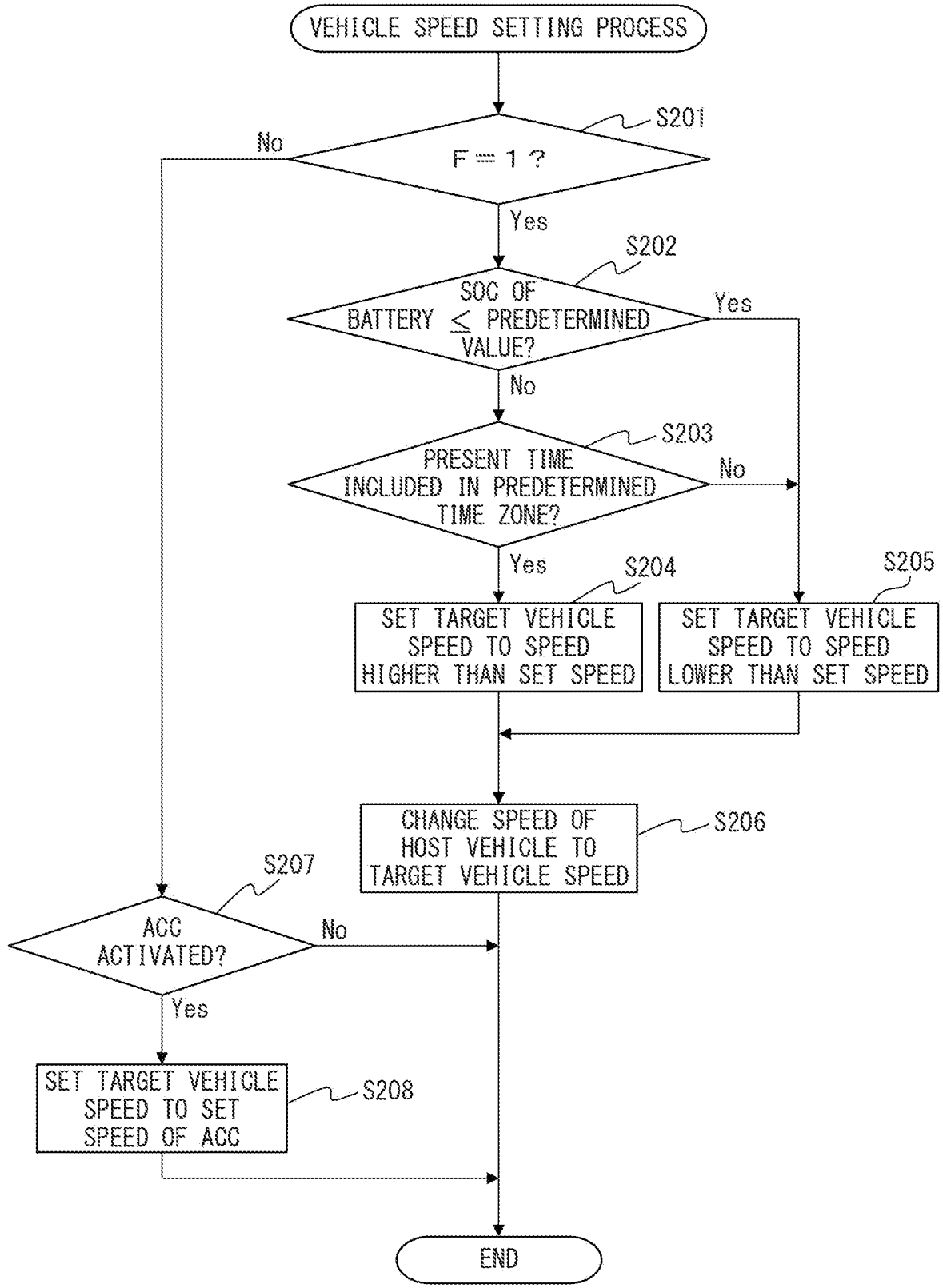
FIG. 5 is a flow chart showing the control routine of the vehicle speed setting process according to the first embodiment.

Referring to FIG. 4 and FIG. 5, the process flow of the above-described control will be described in detail. FIG. 4 is a flow chart showing the control routine of the vehicle search process according to the first embodiment. The control routine is repeatedly executed by the processor 13 of the ECU 10 at predetermined execution intervals.

First, in the step S101, the vehicle detecting unit 15 determines whether or not the condition for starting the follow-up travel is satisfied. The condition for starting the follow-up travel is determined in advance, and is satisfied, for example, when an occupant of the host vehicle activates ACC via the HMI 8.

If it is determined in the step S101 that the condition for starting the follow-up travel is satisfied, the present control routine proceeds to step S102. In the stepping S102, the vehicle detecting unit 15 detections a surrounding vehicle around the host vehicle. For example, the vehicle detecting unit 15 detects the surrounding vehicle around the host vehicle based on the output of the surrounding information detecting device 2. When the surrounding information detecting device 2 is provided in the host vehicle so as to detect data only in front of the host vehicle, a vehicle in front of the host vehicle is detected as the surrounding vehicle. On the other hand, when the surroundings information detecting device 2 is provided in the host vehicle so as to detect the front and rear data of the host vehicle, the front and rear vehicles of the host vehicle are detected as the surroundings vehicles. Note that the vehicle detection unit 15 may detect a surrounding vehicle around the host vehicle via inter-vehicle communication or road-to-vehicle communication.

Next, in the step S103, the vehicle detecting unit 15 determines whether or not a partner vehicle is included in the surrounding vehicle. For example, as a partner vehicle, a vehicle traveling in the same direction as the host vehicle and having a velocity relative to the host vehicle equal to or lower than a predetermined value (for example, 10 km/h) is searched. When the occupant of the host vehicle desires to follow the other vehicle by the host vehicle, the partner vehicle becomes a preceding vehicle of the host vehicle in the follow-up travel. On the other hand, when the occupant of the host vehicle desires to follow the host vehicle by the other vehicle, the partner vehicle becomes a following vehicle of the host vehicle in the follow-up travel.

If it is determined in step S103 that the surrounding vehicle does not include the partner vehicle, the control routine proceeds to step S104. For example, when a vehicle that matches the condition of the partner vehicle is not included in the surrounding vehicle, it is determined that the surrounding vehicle does not include the partner vehicle. In addition, in a case where the surrounding vehicle does not exist around the host vehicle, that is, in a case where the surrounding vehicle is not detected by the vehicle detection unit 15, it is determined that the surrounding vehicle does not include the partner vehicle. In the step S104, the vehicle detector 15 sets the vehicle speed change flag F to 1. The vehicle speed change flag F is used in a control routine of a vehicle speed setting process to be described later. After S104 of steps, the control routine ends.

On the other hand, if it is determined in the step S103 that the surrounding vehicle includes the partner vehicle, the present control routine proceeds to the step S105. In the step S105, the vehicle detection unit 15 notifies an occupant (for example, a driver) of the host vehicle of the partner vehicle via the HMI 8. For example, when the surrounding vehicle 30 of the host vehicle 20 is displayed on the display of the HMI 8 as shown in FIG. 2, the vehicle detection unit 15 displays the surrounding vehicle 30 corresponding to the partner vehicle in a display mode (for example, transparency, brightness, color (hue), color brightness, color saturation, and the like) that is different from the other surrounding vehicles 30. Note that a plurality of surrounding vehicles may be notified to an occupant of the host vehicle as a partner vehicle. In addition, the vehicle detecting unit 15 may notify the occupant of the host vehicle of the identification information (for example, the information of the license plate, the vehicle type, the vehicle name, the color of the vehicle body, and the like) of the partner vehicle by sound or text via the HMI 8.

Thereafter, when the occupant of the host vehicle desires to follow the partner vehicle by the host vehicle, the host vehicle moves to the rear of the partner vehicle by manual driving or automatic driving, and the follow-up travel by the host vehicle to the partner vehicle is started. On the other hand, when the occupant of the partner vehicle desires to follow the host vehicle, the partner vehicle moves to the rear of the host vehicle by manual driving or automatic driving, and the partner vehicle starts to follow the host vehicle. If the information indicating that the occupant of the host vehicle desires to follow the host vehicle by the other vehicle is previously inputted to the HMI 8, the vehicle detection unit 15 may transmit, to the partner vehicle, a notification prompting the follow-up travel to the host vehicle via the inter-vehicle communication or the like when the partner vehicle is detected as the surrounding vehicle.

After the step S105, in the step S106, the vehicle detection unit 15 sets the vehicle speed change flag F to 0. After the step S106, the control routine ends.

On the other hand, if it is determined in step S101 that the condition for starting the follow-up travel is not satisfied, the present control routine proceeds to step S106. In the step S106, the vehicle speed change flag F is set to 0, and after the step S106, the present control routine ends.

FIG. 5 is a flow chart showing the control routine of the vehicle speed setting process according to the first embodiment. The control routine is repeatedly executed by the processor 13 of the ECU 10 at predetermined execution intervals.

First, in the step S201, the vehicle speed setting unit 16 determines whether or not the vehicle speed change flag F is 1. If it is determined that the vehicle speed change flag F is 1, that is, if a partner vehicle is not detected as the surrounding vehicle when the condition for starting the follow-up travel is satisfied, the present control routine proceeds to step S202.

In the step S202, the vehicle speed setting unit 16 determines whether or not SOC of the battery of the host vehicle is equal to or less than a predetermined value (for example, 20% to 40%). The SOC of the battery is calculated, for example, by integrating the input and output current of the battery detected by the battery current sensor or by using a state estimation method such as a Kalman filter.

If it is determined in the step S202 that the SOC of the battery is higher than the predetermined value, the present control routine proceeds to step S203. In the step S203, the vehicle speed setting unit 16 determines whether or not the present time is included in a predetermined time zone. The predetermined time period is set to, for example, a time period corresponding to the morning commuting time (for example, a time period from 6 o'clock to 9 o'clock). The predetermined period may be determined in advance by an occupant of the host vehicle via the HMI 8.

If it is determined in the step S203 that the present time is included in the predetermined time zone, the present control routine proceeds to step S204. In the step S204, the vehicle speed setting unit 16 sets the target vehicle speed of the host vehicle to a speed higher than the set speed of the host vehicle. That is, the vehicle speed setting unit 16 sets the target vehicle speed of the host vehicle to be higher than the set speed of the host vehicle by a predetermined value (for example, 10 km/h to 20 km/h). The set speed of the host vehicle is, for example, the set speed of ACC set by the occupant of the host vehicle.

On the other hand, if it is determined in the step S202 that the SOC of the battery is equal to or less than the predetermined value, or if it is determined in step S203 that the present time is not included in the predetermined time period, the present control routine proceeds to the step S205. In the step S205, the vehicle speed setting unit 16 sets the target vehicle speed of the host vehicle to a speed lower than the set speed of the host vehicle. That is, the vehicle speed setting unit 16 sets the target vehicle speed of the host vehicle to be lower than the set speed of the host vehicle by a predetermined value (for example, 10 km/h to 20 km/h).

After the step S204 or the step S205, the control routine proceeds to step S206. In the step S206, the vehicle speed setting unit 16 controls the acceleration and deceleration of the host vehicle so that the speed of the host vehicle becomes the target vehicle speed by using the actuator 7. The vehicle speed setting unit 16 accelerates the host vehicle when the target vehicle speed is set higher than the set speed, and decelerates the host vehicle when the target vehicle speed is set lower than the set speed.

The vehicle speed setting unit 16 may notify the occupant (for example, the driver) of the host vehicle that the speed of the host vehicle is changed from the set speed of ACC via the HMI 8. As a result, it is possible to prevent the occupant of the host vehicle from feeling anxiety about the behavior of the host vehicle. After the step S206, the control routine ends.

When it is determined in step S201 that the vehicle speed change flag F is zero, the present control routine proceeds to step S207. In the step S207, the vehicle speed setting unit 16 determines whether or not ACC is activated in the host vehicle. If it is determined that ACC is not activated, the control routine ends without setting the target vehicle speed. On the other hand, if it is determined that ACC is activated, the control routine proceeds to step S208.

In the step S208, the vehicle speed setting unit 16 sets the target vehicle speed to the ACC set speed, and maintains the speed of the host vehicle at the ACC set speed. When the speed of the preceding vehicle in front of the host vehicle is lower than the set speed of ACC, the target vehicle speed is set so that the distance between the host vehicle and the preceding vehicle becomes a predetermined distance. After the step S208, the control routine ends.

If the host vehicle is a vehicle (for example, a gasoline vehicle, a diesel vehicle, or the like) using fuel as a power source, the vehicle speed setting unit 16 determines whether or not the remaining fuel amount of the host vehicle is equal to or less than a predetermined value in the step S202. In this case, the vehicle status detecting device 6 includes a fuel sensor, and the fuel remaining amount of the host vehicle is detected by the fuel sensor.

In addition, either one of the steps S202 and S203 may be omitted. Further, the increase or decrease in the target vehicle speed of the host vehicle may be determined based on the determination criteria that differ from the steps S202 and S203. For example, the vehicle speed setting unit 16 may set the target vehicle speed of the host vehicle to a speed lower than the set speed of the host vehicle when the set speed of the host vehicle is equal to or higher than the predetermined value, and set the target vehicle speed of the host vehicle to a speed higher than the set speed of the host vehicle when the set speed of the host vehicle is lower than the predetermined value. As a result, it is possible to prevent the target vehicle speed from deviating from a value suitable for the traffic flow.

Further, the vehicle speed setting unit 16 may set the target vehicle speed of the host vehicle on the basis of preference information preset by the occupant of the host vehicle. In this case, for example, the occupant of the host vehicle selects, via the HMI 8, one of a delay in the arrival time to the destination and an increase in the power consumption or the fuel consumption as an acceptable matter. When the delay of the arrival time to the destination is acceptable, the vehicle speed setting unit 16 sets the target vehicle speed of the host vehicle to a speed lower than the set speed of the host vehicle. On the other hand, when an increase in the power consumption amount or the fuel consumption amount is acceptable, the vehicle speed setting unit 16 sets the target vehicle speed of the host vehicle to a speed higher than the set speed of the host vehicle.

Further, the follow-up travel may be started when ACC is not operated in the host vehicle, that is, when the acceleration and deceleration of the host vehicle is controlled by the driver of the host vehicle. In this case, in the step S101, the follow-up travel is started when the vehicle is traveling on the vehicle-dedicated road at a speed equal to or higher than a predetermined speed. Further, as the set speed of the host vehicle used in the steps S204 and S205, for example, the average speed of the host vehicle in a predetermined time interval up to the present, the set speed estimated from the past travel history of the host vehicle, and the like are used.

Further, in the step S206, the vehicle speed setting unit 16 notifies the driver of the host vehicle of the target vehicle speed of the host vehicle via the HMI 8. As a result, the driver of the host vehicle is prompted to accelerate or decelerate the host vehicle in accordance with the value of the target vehicle speed notified to the driver of the host vehicle.

Second Embodiment

The configuration and control of the follow-up travel support device according to the second embodiment are basically the same as the configuration and control of the follow-up travel support device according to the first embodiment except for the points described below.

Therefore, the second embodiment of the present disclosure will be mainly described below with respect to portions different from the first embodiment.

Figure 6:
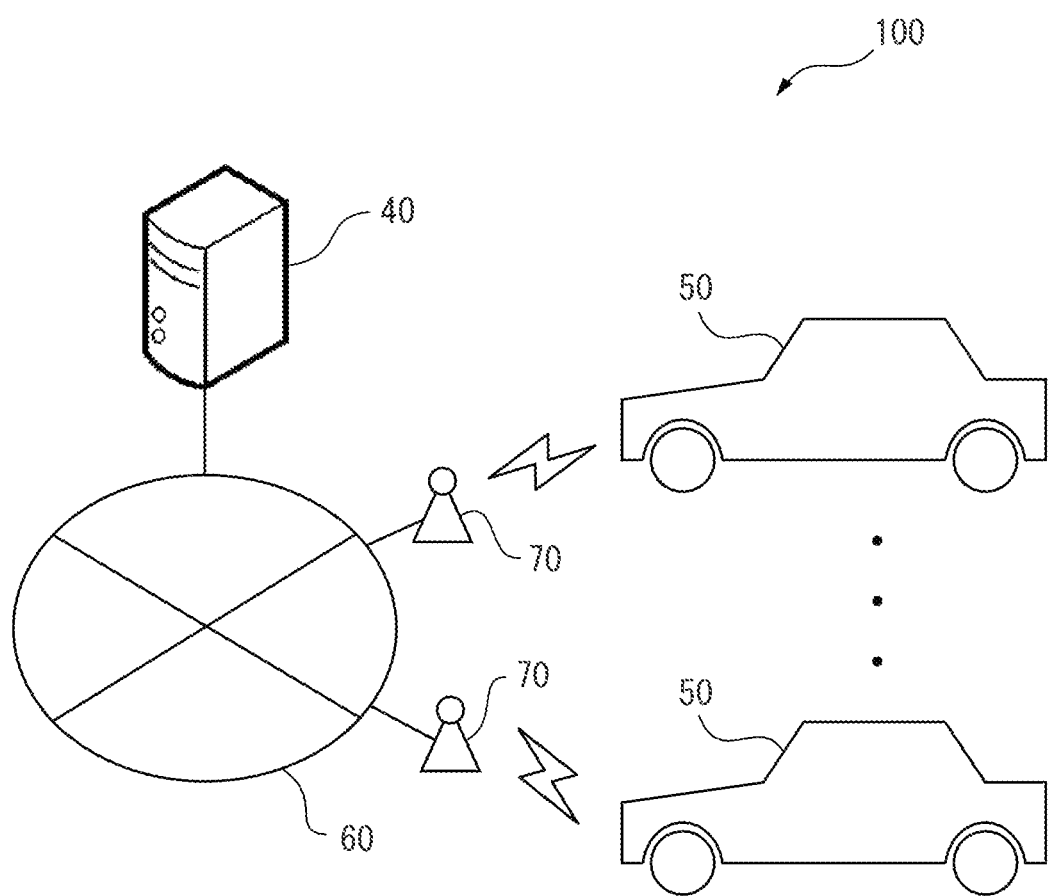
FIG. 6 is a schematic configuration diagram of a follow-up travel support system according to a second embodiment of the present disclosure.

FIG. 6 is a schematic configuration diagram of the follow-up travel support system 100 according to the second embodiment of the present disclosure. As shown in FIG. 1, the follow-up travel support system 100 includes servers 40 and a plurality of vehicles 50. Each of the plurality of vehicles 50 has the same configuration as that of the vehicle control device 1 shown in FIG. 1.

The server 40 can communicate with each of the plurality of vehicles 50 via a communication network 60 such as an Internet network and a radio base station 70 connected to the communication network 60. The communication between the vehicles 50 and the radio base stations 70 is performed by a known radio communication technique (for example, 3G, LTE, 4G, 5G or the like).

Figure 7:
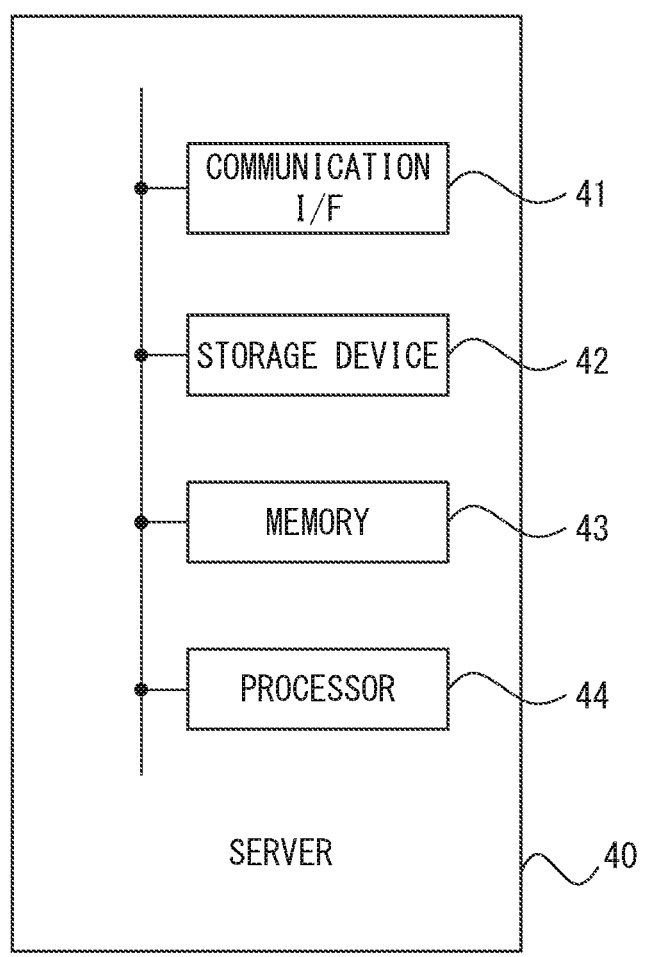
FIG. 7 is a diagram schematically illustrating a configuration of servers.

FIG. 7 is a diagram schematically illustrating a configuration of the server 40. The server 40 includes a communication interface 41, a storage device 42, a memory 43, and a processor 44. The communication interface 41, the storage device 42, and the memory 43 are connected to the processor 44 via a signal line. The server 40 may further include an input device such as a keyboard/mouse, an output device such as a display, and the like. The server 40 may include a plurality of computers.

The communication interface 41 has an interface circuit for connecting the server 40 to the communication network 60. The server 40 communicates with the outside of the server 40 (for example, a plurality of vehicles 50) via the communication network 60. The communication interface 41 is an example of a communication unit of the server 40.

The storage device 42 includes, for example, a hard disk drive (HDD), a solid state drive (SDD), or an optical recording medium and an accessing device thereof. The storage device 42 stores various types of data, and stores, for example, map information, information (identification information, position information, and the like) of the plurality of vehicles 50, computer programs for the processor 44 to execute various processes, and the like. The storage device 42 is an example of a storage unit of the server 40.

The memory 43 includes a non-volatile semiconductor memory (e.g., a RAM). The memory 43 temporarily stores, for example, various kinds of data used when various kinds of processing are executed by the processor 44. The memory 43 is another example of a storage unit of the server 40.

The processor 44 includes one or a plurality of CPU and peripheral circuitry thereof, and executes various processes. The processor 44 may further include other arithmetic circuits such as a logical operation unit, a numerical operation unit, or a graphic processing unit.

The server 40 matches the two vehicles 50 that perform the follow-up travel. Specifically, the server 40 transmits, to the vehicle 50, information for the vehicle 50 that desires to follow the vehicle to encounter the partner vehicle.

For example, the position and speed of the vehicle 50 are periodically transmitted from each of the plurality of vehicles 50 to the server 40, and the server 40 identifies the position of the vehicle 50 that matches the conditions of the partner vehicle based on the information. When the vehicle 50 searching for the partner vehicle is located in front of the partner vehicle, the server 40 instructs the vehicle 50 searching for the partner vehicle to decrease the target vehicle speed. On the other hand, when the vehicle 50 searching for the partner vehicle is located behind the partner vehicle, the server 40 instructs the vehicle 50 searching for the partner vehicle to increase the target vehicle speed.

That is, in the second embodiment, when the condition for starting the follow-up travel is satisfied in the vehicle 50 (host vehicle), the vehicle speed setting unit 16 of the vehicle 50 sets the target vehicle speed of the vehicle 50 based on the information transmitted from the server 40 to the vehicle 50 until the partner vehicle is detected as the surrounding vehicle. This can further increase the probability that the host vehicle encounters the partner vehicle.

Also in the second embodiment, the control routine of the vehicle search process of FIG. 4 is executed in each of the plurality of vehicles 50. In the second embodiment, in each of the plurality of vehicles 50, a control routine of the vehicle speed setting process of FIG. 8 is executed instead of the control routine of the vehicle speed setting process of FIG. 5.

Figure 8:
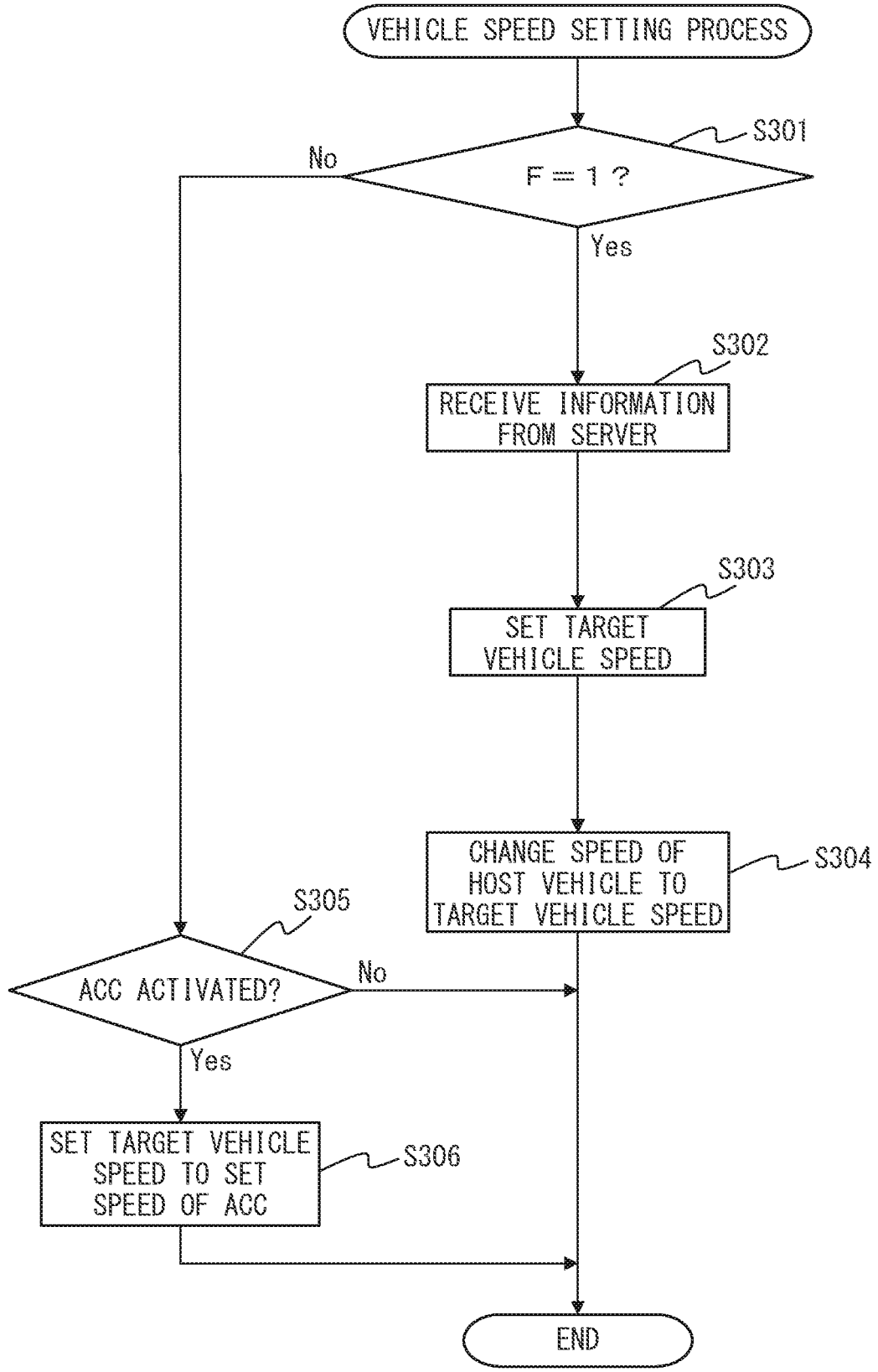
FIG. 8 is a flow chart showing the control routine of the vehicle speed setting process according to the second embodiment.

FIG. 8 is a flow chart showing the control routine of the vehicle speed setting process according to the second embodiment. The control routine is repeatedly executed by the processor 13 of the ECU 10 at predetermined execution intervals.

First, in the step S301, the vehicle speed setting unit 16 determines whether or not the vehicle speed change flag F is 1, similarly to the step S201 of FIG. 5. If it is determined that the vehicle speed change flag F is 1, that is, if the partner vehicle is not detected as the surrounding vehicle when the condition for starting the follow-up travel is satisfied, the present control routine proceeds to step S302.

In the step of S302, the vehicle speed setting unit 16 requests information from the server 40 and receives information from the server 40. At this time, the position and the set speed of the host vehicle are transmitted from the host vehicle to the server 40, and the server 40 identifies the position of the partner vehicle based on the information of the host vehicle.

Next, in the step S303, the vehicle speed setting unit 16 sets the target vehicle speed of the host vehicle based on the data transmitted from the servers 40 to the host vehicle. For example, the information transmitted from the server 40 to the host vehicle is an increase/decrease instruction of the target vehicle speed. When an instruction to increase the target vehicle speed is transmitted from the server 40 to the host vehicle, the vehicle speed setting unit 16 sets the target vehicle speed of the host vehicle to a speed higher than the set speed of the host vehicle. On the other hand, when an instruction to decrease the target vehicle speed is transmitted from the server 40 to the host vehicle, the vehicle speed setting unit 16 sets the target vehicle speed of the host vehicle to a speed lower than the set speed of the host vehicle. Note that the information transmitted from the server 40 to the host vehicle may be a value of the target vehicle speed, a position of the partner vehicle, or the like.

After the step S303, in the step S304, the vehicle speed setting unit 16 controls the acceleration/deceleration of the host vehicle so that the speed of the host vehicle becomes the target vehicle speed by using the actuator 7 as in the step S206 of FIG. 5. After S304 of steps, the control routine ends.

On the other hand, if it is determined in the step S301 that the vehicle speed change flag F is 0, the present control routine proceeds to step S305, and the steps S305 and S306 are executed in the same manner as the steps S207 and S208 of FIG. 5. Note that the control routine of FIG. 8 can be changed in the same manner as the control routine of FIG. 5.

OTHER EMBODIMENTS

While preferred embodiments of the present disclosure have been described above, the present disclosure is not limited to these embodiments, and various modifications and changes can be made within the scope of the claims.

For example, the vehicle in which the follow-up travel support device is provided may be a manual driving vehicle that does not have a driving support function. In this case, the acceleration/deceleration of the vehicle in the follow-up travel is controlled by the driver of the vehicle.

In addition, when the target vehicle speed of the host vehicle is set to a speed different from the set speed of the host vehicle, the vehicle speed setting unit 16 may propose a lane change to a lane suitable for the target vehicle speed to the driver of the host vehicle via the HMI 8. As a result, it is possible to reduce the effect on the traffic flow caused by the change in the speed of the host vehicle. For example, when the target vehicle speed of the host vehicle is set to a speed higher than the set speed of the host vehicle while the host vehicle is traveling in the traveling lane, a lane change to the overtaking lane is proposed to the driver of the host vehicle. On the other hand, when the target vehicle speed of the host vehicle is set to a speed lower than the set speed of the host vehicle while the host vehicle is traveling in the overtaking lane, a lane change to the traveling lane is proposed to the driver of the host vehicle.

In addition, a computer program that causes a computer to realize the functions of the respective units included in the processor 13 of ECU 10 may be provided in a form stored in a computer-readable recording medium. The computer-readable recording medium is, for example, a magnetic recording medium, an optical recording medium, or a semiconductor memory.

DESCRIPTION OF SYMBOLS

10 Electronic control unit (ECU)
13 Processor
15 Vehicle detection unit
16 Vehicle speed setting unit
20 Host vehicle
30 Surrounding vehicles

The invention claimed is:

1. A follow-up travel support device comprising a processor configured to:
   detect a surrounding vehicle around a host vehicle, and set a target vehicle speed of the host vehicle,
   wherein the processor is configured to set the target vehicle speed to a speed different from a set speed of the host vehicle until a partner vehicle that performs a follow-up travel in which a following vehicle follows a preceding vehicle together with the host vehicle is detected as the surrounding vehicle,
   wherein the set speed of the host vehicle is a set speed of an adaptive cruise control set by an occupant of the host vehicle, and the processor is configured to control acceleration and deceleration of the host vehicle so that a speed of the host vehicle becomes the target vehicle speed, and
   wherein the processor is configured to notify the occupant of the host vehicle that the speed of the host vehicle is changed from the set speed of the adaptive cruise control via an output device of the host vehicle.

2. The follow-up travel support device according to claim 1, wherein the processor is configured to set the target vehicle speed to a speed lower than the set speed until the partner vehicle is detected as the surrounding vehicle when a SOC of a battery of the host vehicle or a remaining fuel amount of the host vehicle is equal to or less than a predetermined value.

3. The follow-up travel support device according to claim 1, wherein the processor is configured to set the target vehicle speed to a speed higher than the set speed until the partner vehicle is detected as the surrounding vehicle when a current time is included in a predetermined time zone.

4. The follow-up travel support device according to claim 1, wherein the processor is configured to set the target vehicle speed based on preference information preset by an occupant of the host vehicle until the partner vehicle is detected as the surrounding vehicle.

5. The follow-up travel support device according to claim 1, wherein the processor is configured to set the target vehicle speed based on information transmitted from a server outside the host vehicle to the host vehicle until the partner vehicle is detected as the surrounding vehicle.

6. The follow-up travel support device according to claim 1, wherein the processor is configured to set the target vehicle speed to a speed lower than the set speed until the partner vehicle is detected as the surrounding vehicle when the set speed is equal to or higher than a predetermined value, and set the target vehicle speed to a speed higher than the set speed until the partner vehicle is detected as the surrounding vehicle when the set speed is less than the predetermined value.

7. The follow-up travel support device according to claim 1, wherein the processor is configured to propose a lane change to a lane suitable for the target vehicle speed to the driver of the host vehicle via an output device of the host vehicle when setting the target vehicle speed to a speed different from the set speed of the host vehicle.

8. A follow-up travel support method executed by a computer, comprising:
   detecting a surrounding vehicle around a host vehicle;
   setting a target vehicle speed of the host vehicle to a speed different from a set speed of the host vehicle until a partner vehicle that performs a follow-up travel in which a following vehicle follows a preceding vehicle together with the host vehicle is detected as the surrounding vehicle; and
   notifying a driver of the host vehicle of the target vehicle speed via an output device of the host vehicle when acceleration and deceleration of the host vehicle is controlled by the driver of the host vehicle.

9. A non-transitory recording medium having recorded thereon a computer program, the computer program causing a computer to:
   detect a surrounding vehicle around a host vehicle; and
   set a target vehicle speed of the host vehicle to a speed higher than a set speed of the host vehicle until a partner vehicle that performs a follow-up travel in which a following vehicle follows a preceding vehicle together with the host vehicle is detected as the surrounding vehicle when a current time is included in a predetermined time zone.

\* \* \* \* \*